June 16, 1931.  C. E. CLAPP  1,810,129
NONSKID DEVICE FOR AUTOMOBILE WHEELS
Filed July 21, 1930
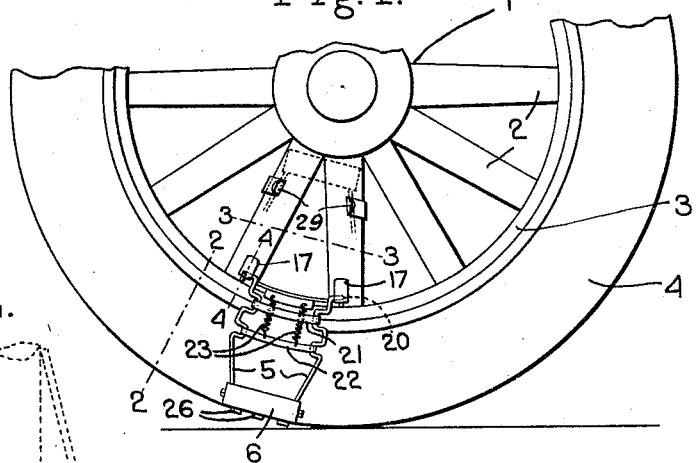
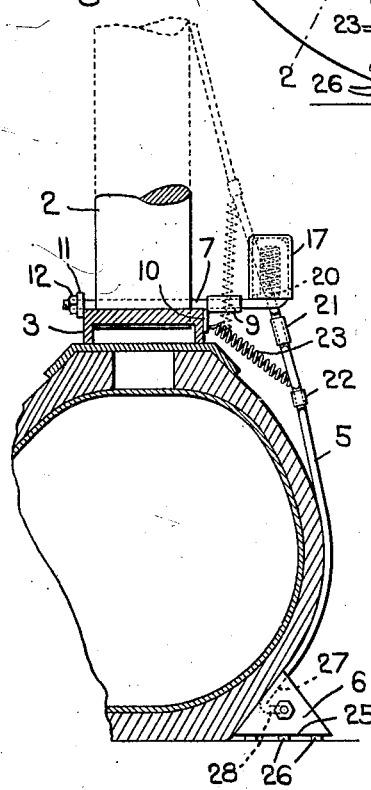
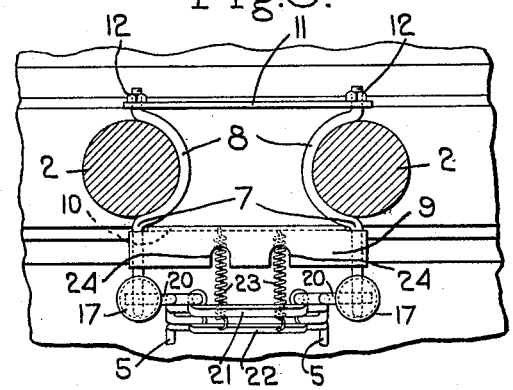
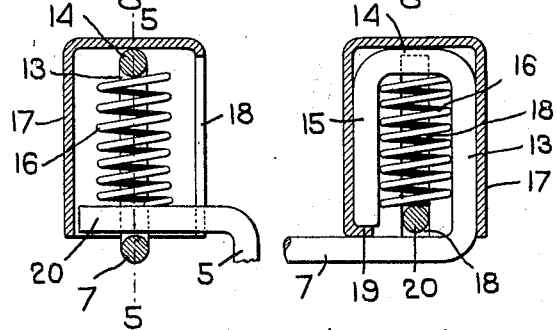
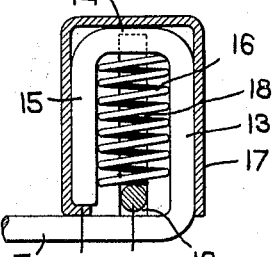
Inventor.
Charles E. Clapp
by Heard Smith & Tennant.
Attys.

Patented June 16, 1931

1,810,129

UNITED STATES PATENT OFFICE

CHARLES E. CLAPP, OF HINGHAM, MASSACHUSETTS

NONSKID DEVICE FOR AUTOMOBILE WHEELS

Application filed July 21, 1930. Serial No. 469,423.

This invention relates to a non-skid device for automobile wheels and has for its object to provide a novel device which is intended to take the place of the non-skid chains that are commonly used and which is so constructed that it can remain permanently on the wheel and can be easily and quickly thrown from inoperative to operative position and vice versa.

In order to give an understanding of the invention I have illustrated in the drawings a selected embodiment thereof which will now be described after which the novel features will be pointed out in the appended claims.

In the drawings, Fig. 1 is a fragmentary view of an automobile wheel equipped with my improved non-skid device;

Fig. 2 is an enlarged section on the line 2—2, Fig. 1;

Fig. 3 is an enlarged section on the line 3—3, Fig. 1;

Fig. 4 is an enlarged section on the line 4—4, Fig. 1;

Fig. 5 is a section on the line 5—5, Fig. 4.

In the drawings 1 indicates generally a portion of an automobile wheel which is provided with the usual spokes 2, rim 3 and tire 4. My improved non-skid device is in the nature of a non-skid member pivotally mounted to the wheel adjacent the rim thereof and adapted to be swung from inoperative position in which it is lying against the spokes into an operative position wherein it lies against the side of the tire and is in position to perform its non-skid function.

The invention contemplates the use of any desired number of these non-skid devices on each wheel but usually four or five will be sufficient. In order to simplify the drawings, however, only one is shown herein but it will be understood that as many other non-skid members may be used on each wheel as is desired.

My non-skid device is formed with two side arms 5 which may conveniently be made of wire and which are pivoted at their inner ends to a holder that is secured to the rim of the wheel and carry at their outer ends a tread or non-skid member 6 which is adapted to engage the road surface when the device is in its operative position.

The holder to which the non-skid member is pivoted is herein shown as located between two spokes of the wheel adjacent the rim 3. This holder comprises two side members 7 which are also shown as being made of wire although they may be made of any suitable material.

The two side members are each bent to fit partially around the two adjacent spokes 2 as shown at 8. These two side members are connected on one side of the wheel by means of a plate member 9 which is rigidly secured to the side members 7 and which is shown as being provided with a positioning flange 10 adapted to engage the rim 3 and thereby help to position the holder. The inner ends of the side members 7 are connected by a connecting member 11 in the form of a plate through which the ends of the side members extend, said plate being held in position by nuts 12.

The pivotal connection between the non-skid member and the holder is one which not only allows the non-skid member to be swung from its operative position against the side of the tire into its inoperative position against the spokes, but which also allows the non-skid member to yield bodily in a radial direction. As herein shown the outer end of each side member 7 is bent upwardly as shown at 13 and then laterally as shown at 14 and then downwardly as shown at 15 thereby forming a loop.

Situated within each of these loops is a spring member 16 and enclosing each loop and spring member is a cap 17. Each cap 17 is slotted on one side as shown at 18 and each cap is provided at its lower end with an inturned lip 19 which underlies the end of the downturned portion 15 and thereby holds the cap in place.

The inner ends of the arms 5 of the non-skid member are bent outwardly as shown at 20. These portions 20 constitute trunnions or pivot portions on which the non-skid member swings. These trunnion portions 20 extend through the slots 18 and through the loops 13, 14, 15, said portions underlying the springs 18. This makes a pivotal connection for the arms 5 which allows the arms to be thrown from the full to the dotted line position Fig. 2 and vice versa and the springs 16 provide a yielding backing for the arms which permit them to yield vertically in case the foot member 6 strikes an obstacle in the road when the device is in use. The loops 13, 14 and 15 and the springs 16 constitute a mounting for the trunnions which allows the trunnions to yield inwardly in a radial direction. The non-skid member may thus have a bodily yielding movement inwardly in a radial direction if the tread portion of the non-skid member strikes an obstacle in the road squarely.

On the other hand, if the obstacle is struck at an angle then one or the other trunnions may yield so as to allow the non-skid member to assume a position determined by the character of the obstacle.

The arms 5 are shown as tied together by two tie members 21 and 22, said members serving to stiffen and strengthen the non-skid member.

23 indicates springs which are fastened at one end to the tie member 22 and at the other ends are connected to the positioning flange 10. Said springs thus yieldingly hold the non-skid member in its operative position as shown in full lines Fig. 2. The springs also function to yieldingly hold the non-skid member in its inoperative position when it is folded against the spokes as shown by dotted lines Fig. 2.

The tie member 9 which ties the sides 8 of the holder together is shown as having notches 24 in its front face situated to receive the springs 23 when the device is folded in its inoperative position.

The foot member 6 may have any desired shape or configuration. It is herein shown as triangular in vertical section and as being provided on its tread face 25 with non-skid projections 26. The inner face of the foot member 6 is provided with grooves 27 in which the outer ends of the arm 5 are received and said arms are bent laterally as shown at 28 and extend through the foot and are either headed over at their ends or are provided with nuts for retaining the foot on the lower bent ends 28 of the arms.

The device is simple and inexpensive to make and can be easily installed on the wheel. When so installed it may be left thereon permanently.

For ordinary use of the automobile the non-skid members will be folded up against the spokes of the wheel as shown in dotted lines Fig. 2 and when in this position it will be entirely out of the way and will not interfere in any way with the ordinary use of the automobile. When it is desired to obtain the protection derived from the use of non-skid members then these members may simply be swung down from their inoperative position shown in dotted lines Fig. 2 to the operative position shown in full lines Fig. 2. When in the latter position the tread member 6 comes flush with the tread surface of the tire and as the wheel is rotated the tread members engage the road surface and thus perform their non-skid function. When the necessity for using the non-skid devices has passed the non-skid members can be easily and quickly thrown back into their inoperative position.

The shifting of the non-skid members from operative to inoperative position and vice versa does not require the use of any tools and can be performed with the foot if necessary so that they can be thrown into and out of action by any one without any danger of having one's clothes or hands soiled by the operation.

If desired, spring-retaining clips 29 may be attached to the wheel which embrace the sides of each non-skid member and serve as an additional means for retaining them in their inoperative position.

I claim:

1. In a non-skid device for an automobile wheel, the combination with a holder adapted to be attached to the automobile wheel adjacent the rim thereof, of a non-skid member having trunnions extending in a direction perpendicular to a radius of the wheel, mountings for the trunnions carried by the holder, whereby the non-skid member may be swung from operative position alongside of the tire to inoperative position against the spokes, said mountings permitting but resisting movement of the trunnions radially.

2. A non-skid device for an automobile wheel comprising a holder presenting two side members, each shaped to fit partially around a spoke of the wheel, means tying said side members together on both the inside and outside of the wheel, the outer ends of the side members being bent into loop formation, a spring within each loop, a cap enclosing each loop and spring, a non-skid member having trunnions extending through the loops and backed by said springs, said non-skid member being adapted to be swung from operative position alongside of the tire to inoperative position lying against the wheel and means for holding the non-skid member yieldingly in operative position.

3. A non-skid device for an automobile wheel, the combination with a holder adapted to be attached to the automobile wheel adjacent the rim thereof, of a non-skid member having two separated trunnions, mountings for said trunnions carried by the holder and in which mountings the trunnions may turn to allow the non-skid member to be swung from operative position alongside of the tire to inoperative position against the spokes, each mounting including a spring acting outwardly in a radial direction against the trunnion, whereby the trunnions may yield inwardly in a radial direction to permit inward bodily movement of the non-skid member and means for holding the non-skid member yieldingly in operative position.

4. A non-skid device for an automobile wheel, the combination with a holder adapted to be attached to the automobile wheel adjacent the rim thereof, of a non-skid member having as a part thereof two separated trunnions, a mounting carried by the holder for each trunnion, each mounting including a spring acting outwardly on the trunnion, said springs being independent from each other and each permitting but resisting inward yielding movement of its trunnion, whereby the non-skid member may yield bodily inwardly or either trunnion may yield separated to provide a yielding fore and aft swinging movement of the non-skid member.

5. In a non-skid device for an automobile wheel, the combination with a holder adapted to be attached to the automobile wheel adjacent the rim thereof, of a non-skid member having trunnions extending in a direction perpendicular to the radius of the wheel, mountings for the trunnions carried by the holder, whereby the non-skid member may be swung from operative position alongside of the tire to inoperative position against the spokes, said mountings permitting but resisting movement of the trunnions radially, and said non-skid member having a detachable tread member adapted to lie alongside of the tire at the tread portion thereof and provided with a tread surface in line with the tread surface of the tire.

6. A non-skid device for an automobile wheel comprising a holder presenting two side members each adapted to fit a spoke of the wheel, two tie members connecting said side members, there being a tie member on each side of the wheel and one of the tie members having a positioning flange to engage the rim of the wheel, a non-skid member having trunnions extending in a direction perpendicular to the radius of the wheel, mountings for the trunnions carried by said holder, said mountings comprising a spring acting on each trunnion, which springs permit the non-skid member to yield bodily inwardly in a radial direction toward the center of the wheel and also permitting each trunnion to yield independently of the other trunnion in a radial direction.

In testimony whereof, I have signed my name to this specification.

CHARLES E. CLAPP.